United States Patent [19]

Kemper et al.

[11] Patent Number: 4,642,782
[45] Date of Patent: Feb. 10, 1987

[54] RULE BASED DIAGNOSTIC SYSTEM WITH DYNAMIC ALTERATION CAPABILITY

[75] Inventors: Christian T. Kemper, Winter Park, Fla.; Simon Lowenfeld, Monroeville; Mark S. Fox, Pittsburgh, both of Pa.

[73] Assignee: Westinghouse Electric Corp., Pittsburgh, Pa.

[21] Appl. No.: 636,196

[22] Filed: Jul. 31, 1984

[51] Int. Cl.⁴ .................. G06F 15/46; G06F 11/30
[52] U.S. Cl. ................................ 364/550; 364/554
[58] Field of Search .......... 364/431.01, 492, 494, 364/550, 551, 554, 556

[56] References Cited

U.S. PATENT DOCUMENTS

| | | | |
|---|---|---|---|
| 4,302,813 | 11/1981 | Kurihara et al. | 364/492 |
| 4,328,556 | 5/1982 | Abe et al. | 364/492 |
| 4,389,706 | 6/1983 | Gomola et al. | 364/492 X |
| 4,404,637 | 9/1983 | Walters et al. | 364/494 |
| 4,471,446 | 9/1984 | Podolsky et al. | 364/494 |
| 4,517,468 | 5/1985 | Kemper et al. | 364/492 X |

OTHER PUBLICATIONS

Fox et al., Techniques for Sensor-Based Diagnosis, Proceedings of the Eighth International Joint Conference on Artificial Intelligence IJCAI-83, vol. 1, pp. 158-163.

Primary Examiner—Felix D. Gruber
Attorney, Agent, or Firm—D. Schron

[57] ABSTRACT

Sensor based diagnostic apparatus for performing on-line realtime monitoring of an industrial or other operating system. The diagnostic apparatus has a rule network for propagation of belief leading to one or more possible malfunctions of equipment in the operating system. The propagation of belief is dynamically altered as a function of the operating conditions of the sensors themselves.

11 Claims, 15 Drawing Figures

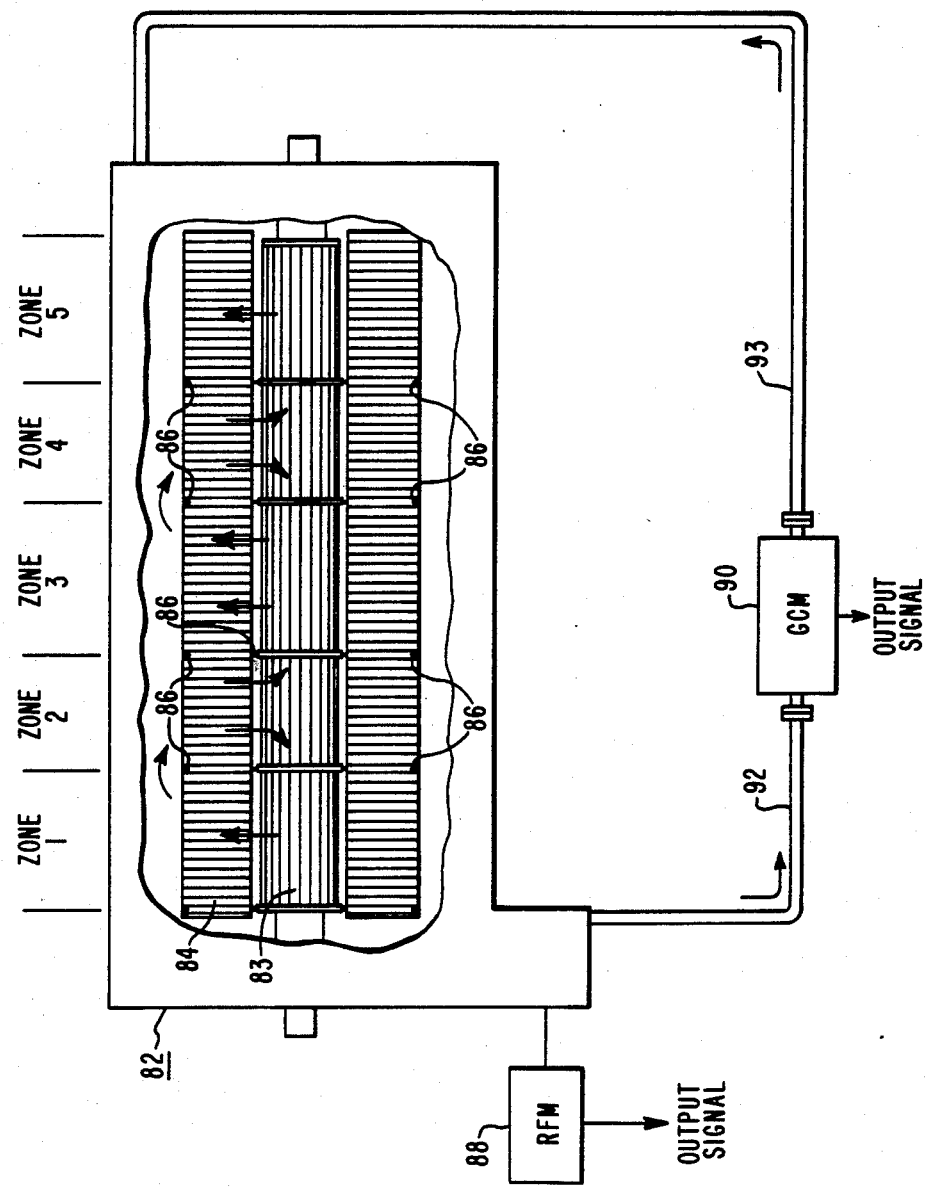

RULE BASED DIAGNOSTIC SYSTEM WITH DYNAMIC ALTERATION CAPABILITY

BACKGROUND OF THE INVENTION

1. Field of the Invention

The invention in general relates to diagnostic apparatus having on-line sensor inputs, and particularly to apparatus which dynamically takes into account failing sensors.

2. Description of the Prior Art

Complex industrial or other operating systems generally having a plurality of sensors for monitoring various parameters during operation, not only for control purposes but for purposes of monitoring the system to detect actual or impending malfunctions.

Some systems may utilize dozens, if not hundreds, of sensors in the diagnostic process and very often the sensors may fail, degrade or provide spurious readings not related to the actual parameter being measured.

Use of erroneous sensor data in the diagnostic process can lead to erroneous conclusions about possible malfunctions. In one respect, a malfunction may be indicated where, in fact, no malfunction exists and conversely a malfunction may be occurring or may occur without its detection and without proper notification to the system operator. Such event can represent a tremendous economic loss as well as a potentially dangerous situation.

Diagnostic apparatus has been proposed which utilizes a rule-based approach for representing diagnostic rules whereby belief leading to a consequent malfunction is propagated, based upon the sensor readings.

The present invention, inter alia, recognizes malfunctioning sensors and functions to dynamically alter the propagation of belief leading to a component malfunction diagnosis by the apparatus thereby reducing the importance of a malfunctioning sensor in the diagnostic process.

SUMMARY OF THE INVENTION

Computer-controlled diagnostic apparatus has stored within the memory of the computer a rule base pertinent to a particular operating system being diagnosed, with the rule base being operable to reach one or more conclusions relative to the condition of the system. The rule base is comprised of a plurality of schema, each being defined by a data structure, having a plurality of slots in which particular attributes of the schema are stored. The rule base includes at least one special rule which is operable to change the contents of any predetermined slot of any predetermined other schema upon the occurrence of a predetermined event and thus dynamically alter the diagnostic process. In an operating system which has a plurality of sensors for monitoring different parameters of the system, diagnostic apparatus is responsive to the sensor signals to diagnose possible malfunctions of the operating system as well as malfunctions of selected sensors. The special rule will operate in response to possible malfunctions of the sensors themselves to reduce or eliminate the malfunctioned sensor's contribution in the diagnostic process.

BRIEF DESCRIPTION OF THE DRAWINGS

FIG. 6 is a simplified diagram of an electrical generator diagram to explain the operation of the present invention with respect to one particular malfunction of the generator;

FIGS. 8A to 8E illustrate certain functions associated with the expert system of FIG. 7;

DESCRIPTION OF THE PREFERRED EMBODIMENT

Figure 1:
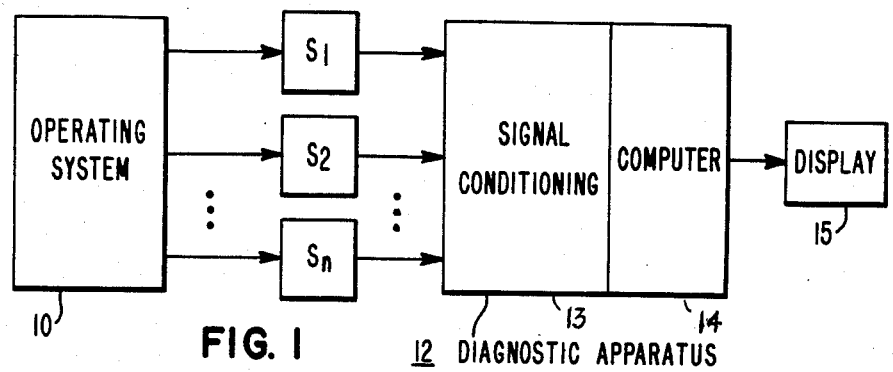
FIG. 1 is a block diagram illustrating the monitoring of an operating system.

In FIG. 1 an industrial or other operating system 10 to be monitored is provided with a plurality of sensors S1, S2 . . . Sn each for monitoring a certain operating parameter of the system, with each being operable to provide an output signal indicative of the monitored parameter.

Diagnostic apparatus 12 receives the sensor output signals and in response thereto provides indications of the overall health of the operating system in general, and of its components in particular, and provides such indications to an output device such as a display 15 for presentation to the operator of the system.

Figure 2:
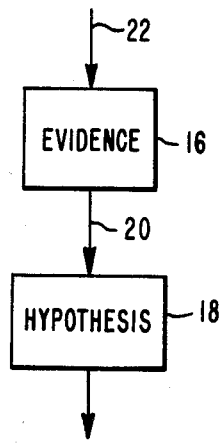
FIGS. 2 and 3 illustrate nodal diagrams utilized to explain one type of expert system which may be utilized in the operation of the present invention.

The diagnostic apparatus 12 in addition to conventional sensor signal conditioning circuits 13 includes a digital computer 14 which in a preferred embodiment controls the diagnostic process by implementation of an expert system computer program that uses knowledge representations and inference procedures to reach conclusions normally determined by a human expert. A common form of knowledge representation is in the form of IF. . . THEN rules and one such system which may be utilized in the practice of the present invention is PDS (Process Diagnosis System) described in the proceedings of the Eighth International Joint Conference on Artificial Intelligence, Aug. 8–12, 1983, pages 158–163. Basically, in that system (as well as other expert systems) for each rule there is an antecedent or evidence (the IF portion) as well as a consequent or hypothesis (the THEN portion) which can become evidence for other rules. As depicted in FIG. 2, evidence 16 is linked to the consequent hypothesis 18 by means of rule 20, with the evidence and hypothesis constituting nodes of the system. Numeral 22 represents a supporting rule of node 16, that is, a rule for which node 16 is a hypothesis. Rule 20 is a supported rule of node 16, that is, a rule for which node 16 is evidence. Likewise, rule 20 is a supporting rule for node 18. In the system, by way of example, nodes can take the form of evidence, hypothesis, malfunctions, sensors and storage-nodes which are nodes capable of storing values input from other nodes and performing some predetermined mathematical operation on the values. All of these nodes, along with rules, constitute components or schemata of the system.

Associated with each node is a measure of belief, MB, that the node (hypothesis) is true, as well as a measure of disbelief, MD, which is a measure of belief that the hypothesis is not true. Both factors range on a scale from 0 to 1 and the difference between them, MB−MD, yields a certainty or confidence factor CF which ranges from −1 to +1, where positive numbers represent confidence that the hypothesis is true and negative numbers represent the belief that the hypothesis is not true; numbers in the vicinity of 0 represent uncertainty.

An expert (or experts) in the field to which the diagnosis pertains establishes the various rules and relationships, which are stored in the computer's memory and utilized in the diagnostic process. The expert's belief in the sufficiency of the rule is also utilized. This belief, which represents the experts' opinion as to how the presence of evidence proves the hypothesis, is given a numerical representation designated as a sufficiency factor, SF, which ranges from −1 to +1 where positive values of SF denote that the presence of the evidence suggests that the hypothesis is true and negative values denote that the presence of the evidence suggests that the hypothesis is not true.

PDS additionally utilizes the expert's belief in the necessity of the rule, which illustrates to what degree the presence of the evidence is necessary for the hypothesis to be true. This necessity belief is given a numeral representation designated as a necessity factor NF which ranges from −1 to +1 where positive values of NF denote that the absence of evidence suggests that the hypothesis is not true and negative values denote that the absence of the evidence suggests that the hypothesis is true.

Figure 3:
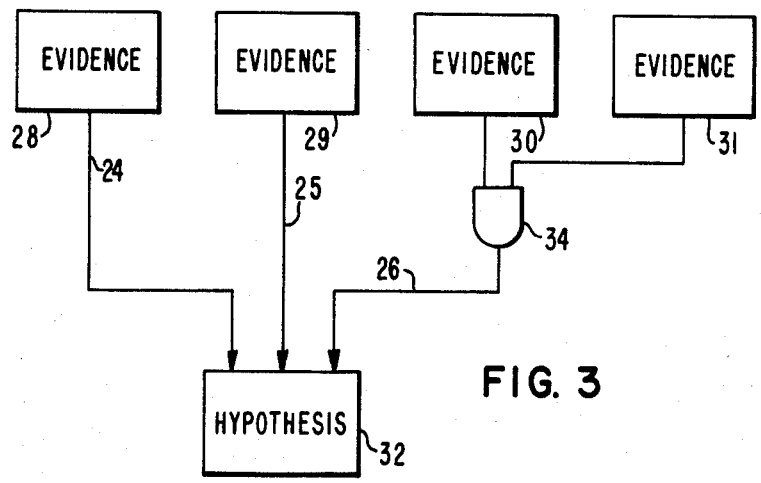

FIG. 3 illustrates another common arrangement wherein a plurality of rules 24 and 26 connect evidence nodes 28 to 31 to a hypothesis node 32. Element 34 represents the combining of evidence in a) a disjunctive manner, that is, if evidence 30 OR 31 is present, or b) in a conjunctive manner, that is, if evidence 30 AND 31 are present. Belief leading to a consequent possible malfunction in the system being diagnosed is propagated from evidence to hypothesis in repetitive cycles, at the beginning of which the CF, MB and MD values of each node are reset to zero (except for a sensor node where the MB and accordingly the CF is assumed to be +1).

If the CF of the evidence is positive, then the rule's sufficiency is utilized to propagate belief, whereas if the CF of the evidence is negative, the rule's necessity is utilized; if CF is zero, nothing is done.

Basically, if the evidence CF is positive and the SF is positive, then the MB of the hypothesis is increased; if the SF is negative, then the MD of the hypothesis is increased.

Conversely, if the evidence CF is negative, and the NF positive, then the MD of the hypothesis is increased, and if the NF is negative, the MB of the hypothesis is increased. By way of example, for the single rule case of FIG. 2, if MB and MD are the belief and disbelief in the rule's hypothesis, CF the confidence in the rule's evidence, and SF and NF are the rule's sufficiency and necessity, then:

if $CF > 0$ and $SF > 0$:

$$MB = CF \times SF \qquad (1)$$

if $CF > 0$ and $SF < 0$:

$$MB = CF \times (-SF) \qquad (2)$$

if $CF < 0$ and $NF > 0$:

$$MB = (-CF) \times NF \qquad (3)$$

if $CF < 0$ and $NF < 0$:

$$MB = CF \times NF \qquad (4)$$

For the multiple rule case of FIG. 3, final values are obtained by examining each rule in sequence and performing the calculations for each rule in accordance with the following where $MB_{old}$ and $MD_{old}$ are the belief and disbelief in the rule's hypothesis before each calculation, CF the confidence in the rule's evidence, SF and NF are the rule's sufficiency and necessity and $MB_{new}$ and $MD_{new}$ are the belief and disbelief in the rule's hypothesis after each calculation:

if $CF > 0$ and $SF > 0$:

$$MB_{new} = MB_{old} + (1 - MB_{old}) \times CF \times SF \qquad (5)$$

if $CF > 0$ and $SF < 0$:

$$MB_{new} = MB_{old} + (1 - MB_{old}) \times CF \times (-SF) \qquad (6)$$

if $CF < 0$ and $NF > 0$:

$$MB_{new} = MB_{old} + (1 - MB_{old}) \times (-CF) \times SF \qquad (7)$$

if $CF < 0$ and $NF < 0$:

$$MB_{new} = MB_{old} + (1 - MB_{old}) \times CF \times NF \qquad (8)$$

For a disjunctive logical node (OR function) the highest confidence factor of all of the pieces of evidence may be utilized, whereas if the logical node is conjunctive (AND function) the minimum of all of the confidence factors may be utilized. Alternatively, a weighted average may be utilized.

Thus, by utilizing the appropriate previous equations, a measure of belief and/or disbelief is calculated for a hypothesis and from these values a confidence factor in the hypothesis is calculated from the relationship $CF = MB - MD$.

Figure 4A:
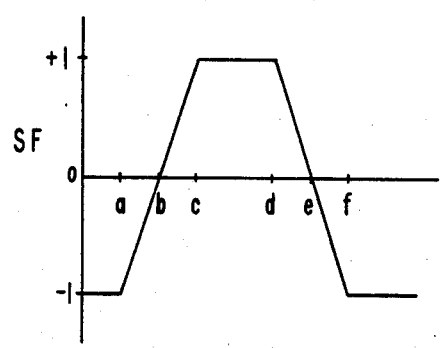
FIGS. 4A and 4B illustrate various functions associated with components of FIGS. 2 and 3.
Figure 4B:
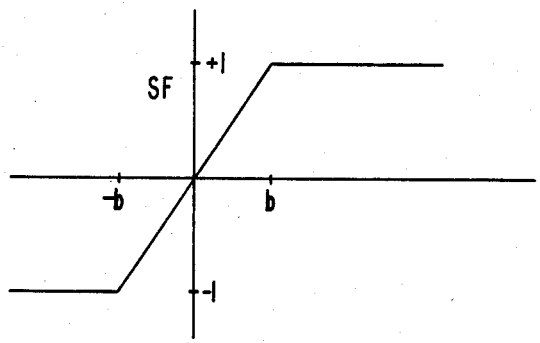

A rule's sufficiency (SF) or necessity (NF) may in many instances be expressed as a constant. In other instances, the sufficiency and/or necessity may be expressed as some other function which will generate a sufficiency or necessity factor of a fixed number by evaluating the function for a particular variable. A common function which may be utilized is a piece-wise linear function, two examples of which are illustrated in FIGS. 4A and 4B. The Y-axis in these figures represent the SF (or NF) ranging from −1 to +1 on the vertical scale. The X-axis horizontal scale represents the value of some variable such as a sensor reading or the result of some mathematical operation, by way of example. In FIG. 4A, if the variable has a value between O and a, or is greater than f, it will generate an SF of −1 whereas if the value is between c and d, it will generate an SF of +1. Values between a and c or d and f will generate corresponding SFs between −1 and +1. FIG. 4B represents a piece-wise linear function wherein any variable value greater than b will generate an SF of +1, any variable value less than −b will generate an SF of −1 and values between $-b$ and $+b$ will generate a corresponding SF between $-1$ and $+1$.

Another type of useful rule is a reading-transform rule which, when carried out, applies a transform function to the value found in the rule's evidence node. If the evidence node is a sensor, the value is a sensor reading, with appropriate conversion, scaling, etc., performed by the transform if needed.

Figure 5A:
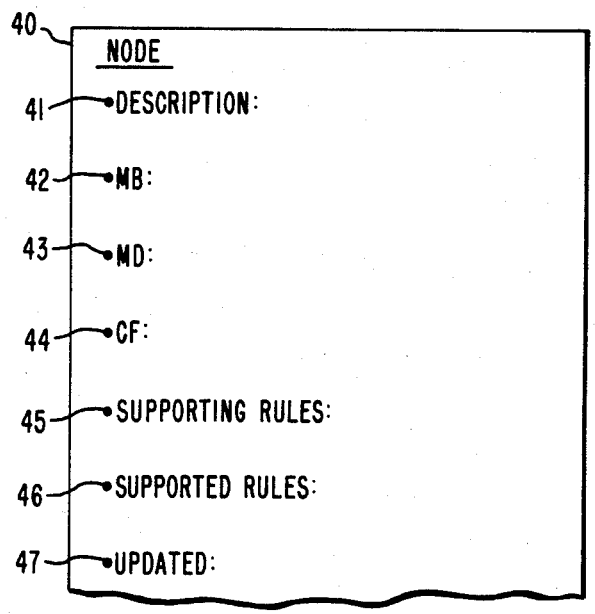
FIGS. 5A through 5C are representations of data structures utilized in the present invention.

The computer 13 of the diagnostic apparatus has in its memory the data structure of all the schemata utilized in the diagnostic process. FIG. 5A shows the general arrangement for a schemata data structure as applied to any node in the diagnostic system. A schema has associated with it various properties or attributes known as "slots" and FIG. 5A illustrates some slots of a generalized node schema structure 40. An explanation of the data stored in the slots is as follows:

NODE

Slot 41—DESCRIPTION: A readable description defining the particular node.
Slot 42—MB: Value of measure of belief in the node being true.
Slot 43—MD: Value of measure of disbelief in the node being true.
Slot 44—CF: Value of the confidence factor calculated from MB−MD.
Slot 45—SUPPORTING RULES: List of rules for which this node is an hypothesis.
Slot 46—SUPPORTED RULES: List of rules for which this node is evidence.
Slot 47—UPDATED: True if MB and MD have been updated. Slot must be true for node to be used in further belief propagation (i.e. must be true for supported rules to fire).

Figure 5B:
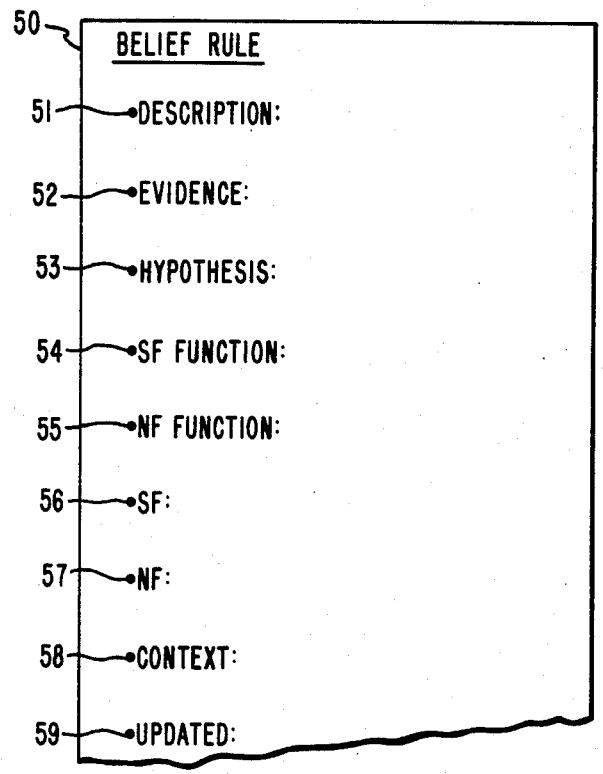

In a similar fashion, belief-rules also have a particular data structure and a generalized belief-rule schema data structure is illustrated with some of its slots, in FIG. 5B. An explanation of the data stored in the slots is as follows:

BELIEF RULE

Slot 51—DESCRIPTION: A readable description defining the particular rule.
Slot 52—EVIDENCE: The name of the rule's evidence (such as a prior hypothesis or sensor node).
Slot 53—HYPOTHESIS: The name of the rule's hypothesis (which can be either a hypothesis or malfunction).
Slot 54—SF FUNCTION: The rule's sufficiency as defined by a particular function such as a piece-wise linear function, or a constant.
Slot 55—NF FUNCTION: The rule's necessity as defined by a particular function such as a piece-wise linear function, or a constant.
Slot 56—SF: The particular value of sufficiency after evaluation of the SF function.
Slot 57—NF: The particular value of necessity after evaluation of the NF function.
Slot 58—CONTEXT: Contains the name of a context schema or logical combination of names of contexts. The context schema has a value of 0 (false) or 1 (true) as determined by the conditions in the monitored system. The context (or logical context combination) as named in this slot must be true in order for the rule to fire. Otherwise the rule is not used in the diagnostic cycle. Different sets of rules may be utilized during the startup of a piece of machinery than during its normal run. The context may be utilized for applying the proper rules. For example a turbine-generator system may have a context of "on-line" which would be 1 if the generator's main circuit breakers were closed, and 0 if not. Other contexts may be established which are always known to be true and others always known to be false.
Slot 59—UPDATED: True if rule has fired.

It is seen therefore that the slots contain both mathematical and descriptive information. Descriptive information and known functions or values are entered by the person creating the rule-base into the data structure prior to the diagnostic process while mathematical values such as MB, MD and CF are calculated in accordance with the appropriate ones of the previous equations during the diagnostic process and placed into their appropriate slots.

Figure 5C:
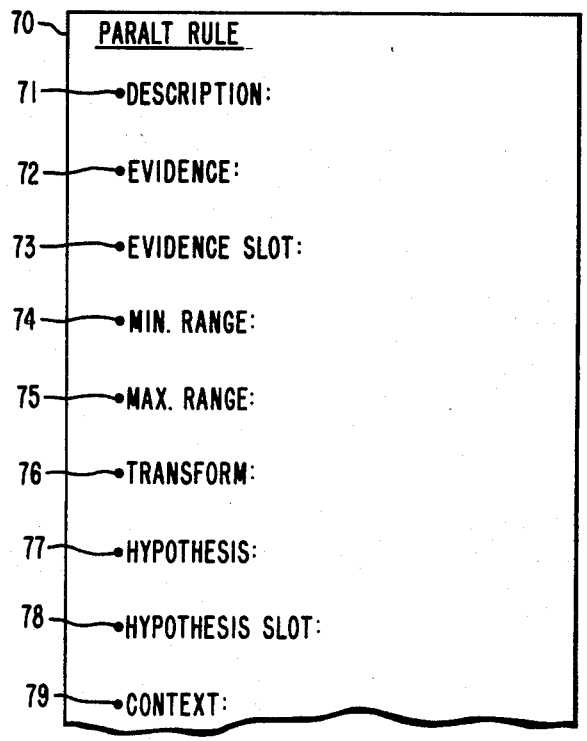

In the present invention a parametric alteration, or paralt, rule is a special type of rule included in the diagnostic system and operable to modify or change any selected slot in any of the schemata of the diagnostic system depending upon an hypothesis such as the operating conditions of the monitoring sensors to thus allow dynamic modification of the propagation of belief. In general, a plurality of such rules are utilized and a typical paralt rule schema data structure 70 is presented in FIG. 5C illustrating various slots associated with the rule and defined as follows:

PARALT RULE

Slot 71—DESCRIPTION: A readable description defining the paralt rule.
Slot 72—EVIDENCE: The name of an already defined evidence node which this rule monitors.
Slot 73—EVIDENCE SLOT: The name of a particular slot in the evidence node containing a number, typically the CF slot.
Slot 74/75—MIN/MAX RANGE: A real number in the range of $-1$ to $+1$ which will cause execution of the paralt rule only if the value in the evidence slot is in the defined range.
Slot 76—TRANSFORM: A particular function such as a piece-wise linear function which transforms the value of the evidence slot into a desired value for the hypothesis slot.
Slot 77—HYPOTHESIS: Filled with the name of one or more existing schema which are to be modified by the paralt rule.
Slot 78—HYPOTHESIS SLOT: The name of a slot that exists in the designated hypothesis. The value in that slot will be changed from whatever it was before the paralt rule fired to whatever the paralt rule transform generates.
Slot 79—CONTEXT: Contains the name of a context schema or logical combination of names of contexts. The context schema has a value of 0 (false) or 1 (true) as determined by the conditions in the monitored system. The context (or logical context combination) as named in this slot must be true in order for the rule to fire. Otherwise the rule is not used in the diagnostic cycle. Different sets of rules may be utilized during the startup of a piece of machinery than during its normal run. The context may be utilized for applying the proper rules. For example a turbine-generator system may have a context of "on-line" which would be 1 if the generator's main circuit breakers were closed, and 0 if not. Other contexts may be established which are always known to be true and others always known to be false.

The invention will be described with respect to the diagnosis of a particular malfunction in an electric generator whereby the provision of the paralt rule can dynamically alter the propagation of belief in the diagnostic process leading to a consequent possible malfunction.

FIG. 6 illustrates a simplified diagram of an electrical generator 82 with a portion of the outer casing broken away to show the rotor 83 and stator core 84. The generator is of the type which is cooled by hydrogen gas flowing through ventilation passages in the rotor and stator and wherein pressure zones 1 to 5 are established, with each zone having a pressure different from its neighboring zone.

In order to accomplish this, core seals 86 are utilized to prevent leakage of hydrogen gas between two adjacent pressure zones such that gas flow between the zones is as indicated by the arrows. The clearance between a seal and the adjacent metallic stator core is very small and in the order of thousandths of an inch. During operation, this small clearance may lead to actual intermittent contact between the seal and the core thus creating an arcing condition. This arcing, as well as other types of arcing in the system, results in an RF current in the neutral grounding lead of the generator and can be detected by means of a radio frequency monitor (RFM) 88 which will provide a corresponding output signal indicative of the arcing condition. A second sensor illustrated in FIG. 6 is a generator condition monitor (GCM) 90 through which the hydrogen gas is circulated via conduits 92 and 93 in order to detect the presence of thermally produced particles in the hydrogen atmosphere of the generator. In the event that a seal does contact a metal part resulting in an arcing condition, any oil mist or vapor present in the hydrogen will become ionized to cause particulation which will be carried by conduit 92 to GCM 90 resulting in an output signal therefrom indicative of the condition. The sensor output signals from RFM 88 and GCM 90 are provided to the diagnostic computer and the presence of any abnormal signals indicating an arcing condition and a particulating condition will provide some indication relative to the existence of arcing in the core seals.

The RFM sensor as well as the GCM sensor are items well known to those persons skilled in the art and are commercially available in various forms.

Figure 7:
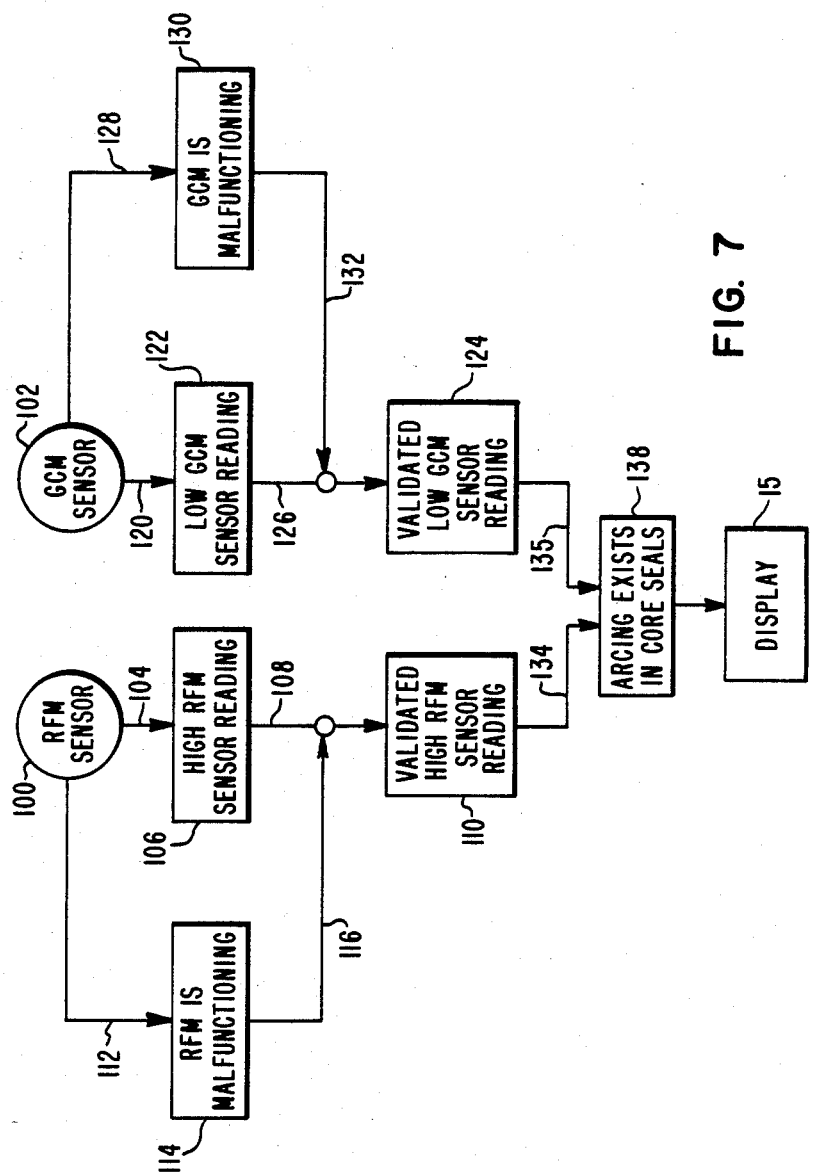
FIG. 7 is a nodal diagram of a portion of an expert system used in the propagation of belief relative to a particular malfunction of the generator illustrated in FIG. 6.

FIG. 7 illustrates, in the previously described node and rule form, a subsystem established by the diagnostic process for determining the malfunction of arcing in the core seals of the generator of FIG. 6. Sensor nodes 100 and 102 are at the first level of diagnosis and receive respective RFM and GCM readings each of which in the present example normally ranges on a scale from 0 to 100 representing percentage of full scale.

Figure 8A:
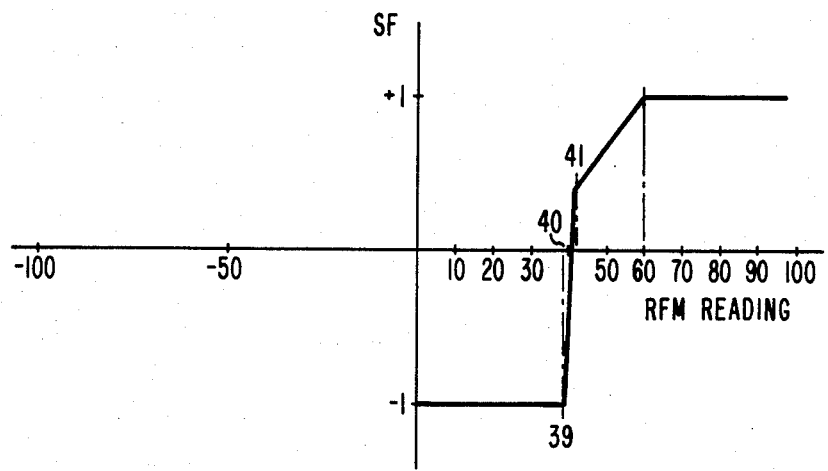

RFM sensor node 100 supports rule 104 which utilizes a piece-wise linear curve to map the RFM reading into a confidence factor that the RFM sensor reading is high, as depicted at node 106. By way of example FIG. 8A illustrates a piece-wise linear curve which would be stored in the SF function slot of rule 104. From the example in FIG. 8A, wherein RFM reading is plotted on the horizontal scale and SF on the vertical scale, it is seen that if the RFM reading at node 100 has a value greater than 60, then the sufficiency factor will be +1 and, in accordance with one of the previous equations, will result in a confidence factor of +1 that the reading is in fact high.

Any reading below a value of 39 generates a sufficiency factor of −1 resulting in a determination that the RFM reading is definitely not high. Readings between the 39 and 41, and 41 and 60 values will have proportionate SF values in accordance with the curve.

The confidence in a high reading at node 106 is used in further equipment diagnosis only after validation of the reading by consideration of the condition of the RFM sensor itself.

Thus validation of the high reading is accomplished by rule 108 having the high sensor reading at node 106 as its evidence and a validated high reading at node 110 as its hypothesis. The SF of rule 108 is initially +1 such that in the absence of any sensor malfunction, the confidence in a high sensor reading is passed unaltered from node 106 to node 110.

Figure 8B:
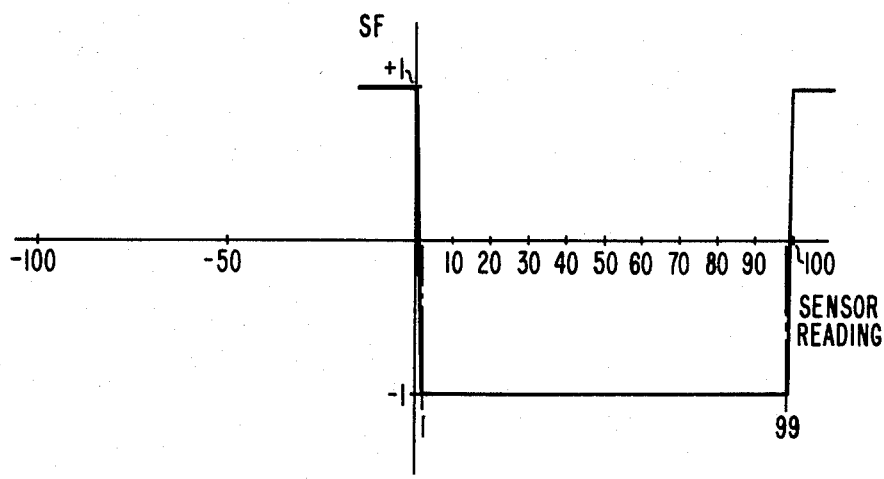

One way of testing a condition of the sensor is by utilization of rule 112 having a piece-wise linear sufficiency function as illustrated in FIG. 8B, wherein sensor reading is plotted on the horizontal axis and SF on the vertical axis. Rule 112 is utilized to determine if the RFM reading of node 100 is within its defined range of 0 to 100. Any readings near or outside of these bounds represents a malfunction of a sensor. Thus in FIG. 8B any reading below 0 or above 100 will generate a sufficiency factor of +1 leading to a 100% confidence in node 114 that the sensor is malfunctioning. Any reading between 1 and 99 generates an SF of −1 resulting in a conclusion that the sensor definitely is not malfunctioning.

Figure 8C:
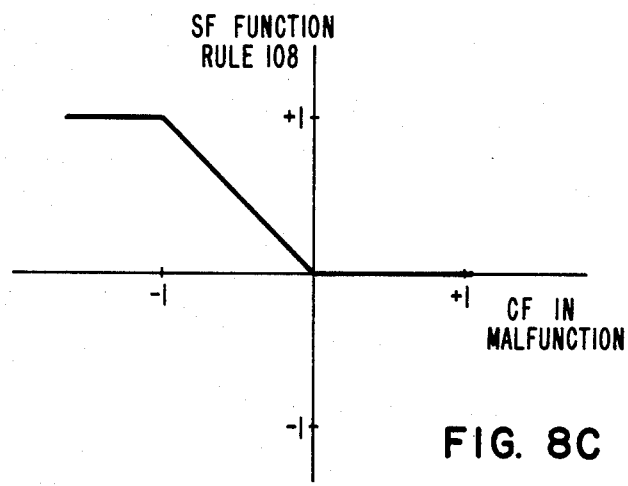

If there is a malfunction in the sensor the propagation of belief in a high sensor reading must be modified. This modification is accomplished according to the present invention by paralt rule 116 which utilizes the piece-wise linear function of FIG. 8C to map the confidence in a malfunctioning sensor into a new constant value for SF function for rule 108. In FIG. 8C confidence in a sensor malfunction is plotted on the horizontal axis and new constant value for SF function for rule 108 on the vertical axis. As previously discussed, the SF value is the value of sufficiency after evaluation of the SF function. Therefore, the paralt rule effectively changes the rule's SF since SF takes on the new constant value of the rule's SF function. With additional reference to a paralt rule structure as in FIG. 5C, the curve of FIG. 8C would be stored in the transform slot 76. Evidence slot 72 would contain the name of node 114 while slot 73 would contain the slot corresponding to the evidence's CF (slot 44 of FIG. 5A). Since, in the example of FIG. 7, the paralt-rule is modifying another rule, the hypothesis slot 77 would be filled in with the name of the rule that is being modified, that is, rule 108, whereas slot 78 would be filled in with the particular slot being modified in the hypothesis (the SF function slot 54 of FIG. 5B).

Accordingly, if the confidence in a sensor malfunction is −1, indicating no malfunction, then the sufficiency factor of rule 108 which has a value of +1 remains unchanged. If the confidence factor in the malfunction is 0 or greater, indicating a malfunction, then the SF function (and accordingly, the SF) of rule 108 is replaced with a 0 value thereby cutting off propagation of belief in a high sensor reading, from node 106 to node 110. Confidence factor values between 0 and −1 generate proportionally different SF functions which do not cut off propagation of belief in a high sensor reading, but reduce this belief.

Figure 8D:
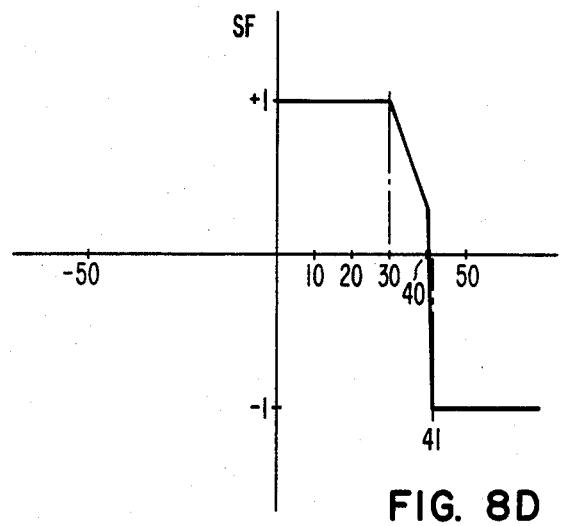

With respect to the GCM sensor, node 102 supports rule 120 which maps the GCM reading into a confidence factor that the reading is low, as depicted at node 122. The rule utilizes a piece-wise linear function such as illustrated in FIG. 8D wherein the GCM reading is plotted on the horizontal axis and SF on the vertical axis. As seen in FIG. 8D any reading below a value of 30 generates a sufficiency factor of +1 indicative of an actual low sensor reading, whereas values of 41 or greater generate a sufficiency factor of −1, indicating that the GMC reading is not high. Readings between the 30 and 40 and 40 and 41 values generate proportionally different sufficiency factors.

In the absence of a GCM sensor malfunction the confidence in a low sensor reading is passed unaltered to node 124 via rule 126 which would have an initial sufficiency factor of +1.

Propagation of this belief is tempered however in the presence of a malfunctioning GCM sensor. For the example of FIG. 7 this determination is made in a manner identical to that with respect to the RFM sensor. That is, rule 128 will cause the generation of a sufficiency factor of +1 if the GCM reading is less than 0 or greater than 100 and a sufficiency factor of −1 if the reading is between 1 and 99 as depicted in the previously described piece-wise linear function of FIG. 8B. The generated sufficiency factor is utilized to calculate the belief in a malfunctioned GCM as depicted at node 130 which supports paralt rule 132 having stored in its transform slot a piece-wise linear function identical to that depicted in FIG. 8C. Rule 126 is the designated hypothesis for paralt rule 132 and the SF function of rule 126 would be the hypothesis slot that is modified in a manner identical to that described with respect to paralt rule 116 and rule 108.

The validated high RFM sensor reading of node 110 and validated low GCM sensor reading of node 124 support respective rules 134 and 135 leading to the malfunction node 138 indicative of an arcing in the generator core seals.

Let it be assumed that both the sufficiency and necessity factors of rules 134 and 135 are equal to 0.5. Let it further be assumed that both sensor readings are within their allowable ranges and that the RFM reading is below 39 and the GCM reading above 41. Utilizing the piece-wise linear functions and the previously provided equations, the CF for both sensor malfunctions 114 and 130 will be −1 resulting in validated readings at nodes 110 and 124 each of which will have an associated CF of −1 (disbelief in a high RFM reading and disbelief in a low GCM reading). The confidence factor in malfunction 138 therefore is calculated to be −0.75 very strongly indicating that no malfunction is present since the value is negative.

Suppose that on some subsequent reading the RFM sensor node 100 receives a value of 62 and the GCM sensor node 102 receives a value of 10, indicative of an arcing condition. With no sensor malfunction, confidence in the validated high and low sensor reading nodes 110 and 124 are both +1 resulting in a malfunction confidence factor of 0.75 at node 138 strongly indicative of an arcing condition.

Let it be assumed that at some subsequent reading the RFM sensor goes off scale to a value of 103. In such instance the sufficiency factor of rule 108 gets set to 0 resulting in a confidence factor of 0 for the validated high RFM sensor reading node 110. Under such conditions, the confidence in the malfunction node 138 is calculated to be 0.5. This confidence as well as all calculated confidences may be converted to a corresponding display signal which is provided to display 15 for presentation to the system operator.

Thus a rule-based diagnostic system has been described wherein belief is propagated leading to a resultant possible malfunction. The propagation of belief is dynamically altered by taking into account sensor malfunctions in the diagnostic process.

Figure 9:
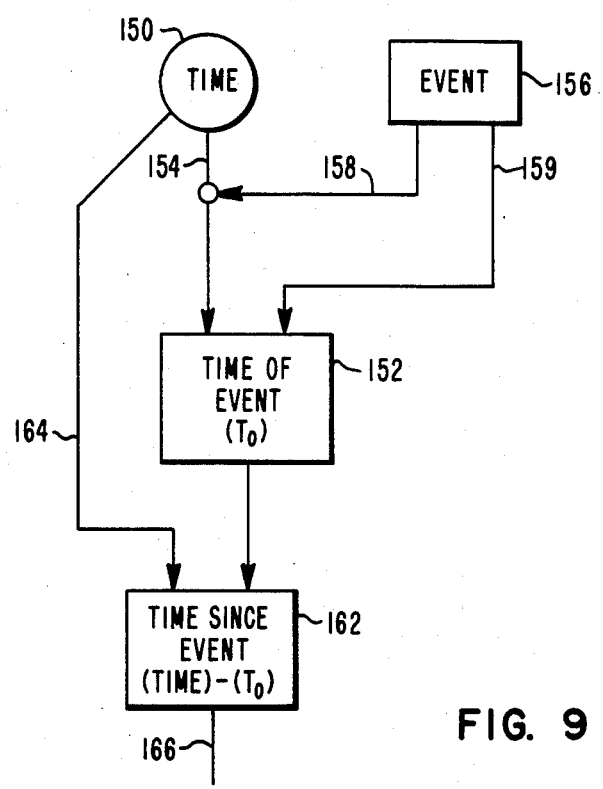
FIG. 9 is a nodal diagram of an expert system fragment illustrating another function of the present invention.

In general, the paralt rule is operable to modify any slot or slots in any schema of the overall diagnostic system. The elemental example of FIG. 7 serves to demonstrate one aspect of the present invention. Although in FIG. 7 the SF function slot of another rule is modified it is understood that in other applications both SF and NF functions may be modified to effectively change the rule's SF and NF values. With the paralt rule of the present invention, functions of other schema can be changed as well as descriptive names. Further, propagation of belief may be terminated by disallowing a particular rule to fire. The paralt rule may accomplish this latter function merely by changing the context slot of another rule. For example, the name of the current context may be replaced by a different context whose value is known to be 0 (false). Yet another operation of the paralt rule is illustrated in FIG. 9 to which reference is now made.

In many diagnostic processes conclusions are reached, inter alia, utilizing the time of occurrence of a certain event. Time, accordingly, is propagated in the subsystem established for the diagnostic process. FIG. 9 illustrates another use of the paralt rule whereby time since the occurrence of a particular event is established and propagated.

Node 150 represents a sensor node into which time is continuously updated. The time is propagated to node 152 via rule 154. Node 156 represents the occurrence of a predetermined event which is linked to rule 154 by a paralt rule 158 and linked to node 152 by another paralt rule 159. In the absence of the event, node 152 is continuously updated with the time propagated by rule 154. Node 162 also receives the time via rule 164 and if the event occurs at time $T_O$ it is operable to compute the time since the event, that is, time minus $T_O$. In the absence of the event, current time is propagated to node 152 whereby node 162 subtracts the current time from the current time, yielding a result of 0.

Upon the occurrence of the event, paralt rule 158 fires and is operable, by way of example, to change rule 154's context (slot 58 of FIG. 5B) so that it evaluates to zero, thereby cutting off propagation of time, in which case node 152 will store the last received time, corresponding to the occurrence of the event. This stored time, however, will be propagated to rule 162 only if node 152 is updated. Accordingly, paralt rule 159 is operable to maintain the node's updated slot (slot 47 of FIG. 5A) in a continuously true state such that the time of occurrence of the event is propagated to node 162 which continuously receives the current time to thereby calculate the time since the event, for further propagation via rule 166 in the diagnostic process. With respect to a sensor-based diagnostic system, the event may be the occurrence of a drastic change in a particular sensor's reading and wherein one piece of evidence leading to a possible sensor malfunction would be the duration of time since the drastic change.

Although FIG. 7 illustrates a determination of a sensor malfunction utilizing a single node (100) and rule (112), it is understood that in complex operating systems being monitored, such determination of sensor malfunctions is reached utilizing many rules and test conditions such as described in copending application Ser. No. 06/636,195 filed concurrently herewith, assigned to the same assignee as the present invention and hereby incorporated by reference.

What is claimed is:

1. A method of diagnosing an operating system to malfunctions comprising the steps of:
   (A) storing a rule base pertinent to the particular operating system being diagnosed and being operable to reach one or more conclusions relative to the condition of said system and being comprised of a plurality of schema, each said schema being defined by a data structure having a plurality of slots in which particular attributes of the schema are stored; and
   (B) changing the contents of any predetermined slot of any predetermined other schema upon the occurrence of a predetermined event.

2. A method according to claim 1 which includes the step of:
   (A) providing said plurality of schema with a plurality of rules each linking evidence to a consequent hypothesis.

3. A method according to claim 2 which includes the step of:
   (A) providing each said hypothesis with an update slot which must be provided with a true value before said hypothesis will participate in said diagnosis; and wherein
   (B) said step of changing provides said true value to said update slot of a predetermined hypothesis upon the occurrence of said event.

4. A method according to claim 2 which includes the steps of:
   (A) providing each of said rules with a context slot, designating a context, where the context may be true or false, and said rules will participate in said diagnosis only if their respective context is true; and
   (B) said step of changing provides at least one selected rule with a context of a known true or false state.

5. A method of diagnosing an operating system subject to malfunctions, comprising the steps of:
   (A) providing a plurality of sensors throughout said operating system to obtain respective signals indicative of predetermined operating parameters of said system;
   (B) storing a rule base pertinent to the particular operating system being diagnosed;
   (C) providing said sensor signals as inputs to said rule base to propagate belief leading to at least one particular consequent malfunction of said operating system;
   (D) diagnosing by said rule base, possible malfunctions of said sensors themselves; and
   (E) modifying said propagation of belief as a function of any sensor malfunction.

6. A method of diagnosing an operating system subject to malfunctions and having a plurality of sensors providing signals related to system parameters, comprising the steps of:
   (A) storing a rule base pertinent to the particular operating system being diagnosed;
   (B) providing said sensor signals as inputs to said rule base to diagnose malfunctions of said operating system, based upon said sensor signals said rule base being comprised of a plurality of schema, each said schema being defined by a data structure having a plurality of slots into which particular attributes of the schema are stored; and
   (C) changing the contents of at least one slot in a predetermined other schema upon the occurrence of a predetermined condition of at least one sensor of said plurality.

7. A method according to claim 6 which includes the step of:
   (A) providing said plurality of schema with a plurality of rules each linking evidence to a consequent hypothesis.

8. A method according to claim 7 which includes the steps of:
   (A) providing each of said rules with an associated predetermined sufficiency factor numerically defining the degree of belief in the rule's hypothesis when the rule's evidence is true.
   (B) storing said sufficiency factor of the rule's data structure; and wherein
   (C) said step of changing effectively changes the value of another rule's sufficiency factor upon said predetermined malfunction.

9. A method according to claim 7 which includes the steps of:
   (A) providing each of said rules with an associated predetermined necessity factor numerically defining to what degree the presence of the evidence is necessary for the hypothesis to be true;
   (B) storing said necessity factor in a slot of the rule's data structure; and wherein
   (C) said step of changing effectively changes the value of another rule's necessity factor upon said predetermined malfunction.

10. A method of on-line diagnosing of an operating system comprising the steps of:
    (A) connecting a plurality of sensors to said system to obtain sensor signals relating to predetermined parameters of said system, while said system is in operation;
    (B) providing indications relating to the overall operating condition of said system, based upon said sensor signals;
    (C) monitoring the operating condition of said sensors themselves;
    (D) modifying the value of a sensor's input contribution to said diagnosis if the particular sensor itself is in an abnormal operating condition.

11. A method according to claim 10 which includes the step of:
    (A) utilizing a rule-based expert system to provide said indications relating to the overall operating condition of said system.

* * * * *